US009568930B2

(12) United States Patent
Castelaz et al.

(10) Patent No.: US 9,568,930 B2
(45) Date of Patent: *Feb. 14, 2017

(54) SYSTEM AND METHOD FOR MANAGING A POWER SYSTEM WITH MULTIPLE POWER COMPONENTS

(71) Applicant: Motiv Power Systems, Inc., Foster City, CA (US)

(72) Inventors: Jim Michael Castelaz, Alameda, CA (US); Jessica Riley, Mountain View, CA (US); Steven Diamond, San Mateo, CA (US); Sam Chang, Mountain View, CA (US); Vishal Parikh, Palo Alto, CA (US); Benson Tsai, Mountain View, CA (US)

(73) Assignee: Motiv Power Systems, Inc., Foster, CA (US)

( * ) Notice: Subject to any disclaimer, the term of this patent is extended or adjusted under 35 U.S.C. 154(b) by 338 days.

This patent is subject to a terminal disclaimer.

(21) Appl. No.: 14/231,728

(22) Filed: Mar. 31, 2014

(65) Prior Publication Data

US 2014/0330446 A1 Nov. 6, 2014

Related U.S. Application Data

(63) Continuation of application No. 12/908,816, filed on Oct. 20, 2010, now Pat. No. 8,698,351.

(Continued)

(51) Int. Cl.
*H02J 1/12* (2006.01)
*H02J 3/00* (2006.01)
(Continued)

(52) U.S. Cl.
CPC .............. *G05F 1/66* (2013.01); *B60L 11/1842* (2013.01); *G05B 15/02* (2013.01); *H02J 1/102* (2013.01);
(Continued)

(58) Field of Classification Search
CPC .......... H02J 4/00; H02J 1/102; B60L 11/1842; G05B 15/02; G05F 1/66; Y02T 10/7072; Y02T 10/7005; Y02T 90/163; Y02T 90/14; Y02T 90/128; Y04S 10/126; Y02E 60/721; Y10T 307/406; Y10T 307/359; Y10T 307/511; Y10T 307/50; Y10T 307/516; Y10T 307/32
(Continued)

(56) References Cited

U.S. PATENT DOCUMENTS 5,498,950 A 3/1996 Ouwerkerk .................... 320/118
5,656,915 A 8/1997 Eaves .............................. 320/6
(Continued)

OTHER PUBLICATIONS

Multiplexer, available on Jan. 6, 2007 at http://web.archive.org/web/20070106000816/http://en.wikipedia.org/wiki/Multiplexers.
(Continued)

*Primary Examiner* — Rexford Barnie
*Assistant Examiner* — Toan Vu
(74) *Attorney, Agent, or Firm* — Imperium Patent Works; Amir V. Adibi

(57) ABSTRACT

According to a preferred embodiment of the invention, the system for managing a power system with a plurality of power components that includes power source components and power consumption components includes a central power bus, a plurality of adaptable connectors that each electrically couple to a power component and to the central power bus, and a control processor that receives the state of each power component from the respective adaptable connector and is configured to balance the voltage and current output from each power source component to provide a desired power to a power consumption component based on the received states.

19 Claims, 9 Drawing Sheets

Related U.S. Application Data

(60) Provisional application No. 61/279,442, filed on Oct. 20, 2009.

(51) Int. Cl.

| | | |
|---|---|---|
| *G05F 1/66* | (2006.01) | |
| *H02J 4/00* | (2006.01) | |
| *B60L 11/18* | (2006.01) | |
| *G05B 15/02* | (2006.01) | |
| *H02J 1/10* | (2006.01) | |

(52) U.S. Cl.
CPC ............ *H02J 4/00* (2013.01); *H02J 2001/106* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01); *Y10T 307/32* (2015.04); *Y10T 307/359* (2015.04); *Y10T 307/406* (2015.04); *Y10T 307/50* (2015.04); *Y10T 307/511* (2015.04); *Y10T 307/516* (2015.04); *Y10T 307/527* (2015.04)

(58) Field of Classification Search
USPC ........................................................... 307/25
See application file for complete search history.

(56) References Cited

U.S. PATENT DOCUMENTS

| | | | |
|---|---|---|---|
| 5,710,504 A | 1/1998 | Pascual et al. ................... 320/6 |
| 5,818,201 A | 10/1998 | Stockstad et al. ............ 320/119 |
| 5,920,179 A | 7/1999 | Pedicini ........................ 320/122 |
| 5,982,143 A | 11/1999 | Stuart ........................... 320/119 |
| 5,998,967 A | 12/1999 | Umeki et al. ................. 320/122 |
| 6,064,178 A | 5/2000 | Miller ........................... 320/117 |
| 6,114,835 A | 9/2000 | Price ............................. 320/118 |
| 6,121,751 A | 9/2000 | Merritt ......................... 320/116 |
| 6,459,175 B1 | 10/2002 | Potega .......................... 307/149 |
| 6,459,236 B2 | 10/2002 | Kawashima ................. 320/118 |
| 6,518,725 B2 | 2/2003 | Marten ......................... 320/116 |
| 6,624,612 B1 | 9/2003 | Lundquist .................... 320/118 |
| 6,675,302 B2 | 1/2004 | Ykema ......................... 713/300 |
| 6,700,350 B2 | 3/2004 | Formenti et al. ............. 320/119 |
| 6,738,692 B2 | 5/2004 | Schienbein et al. .......... 700/286 |
| 6,751,740 B1 | 6/2004 | Robertson et al. ........... 713/300 |
| 6,777,908 B2 | 8/2004 | Thorne et al. ................ 320/103 |
| 6,841,971 B1 | 1/2005 | Spee et al. .................... 320/119 |
| 7,081,737 B2 | 7/2006 | Liu et al. ...................... 320/130 |
| 7,245,108 B2 | 7/2007 | Chertok et al. ............... 320/132 |
| 7,307,402 B2 | 12/2007 | Parent et al. ................. 320/118 |
| 7,360,100 B2 | 4/2008 | Allred et al. ................. 713/300 |
| 7,598,706 B2 | 10/2009 | Koski et al. .................. 320/117 |
| 8,698,351 B2 * | 4/2014 | Castelaz .................. H02J 4/00 307/25 |
| 2003/0043597 A1 | 3/2003 | Betts-LaCroix ................ 363/16 |
| 2003/0230934 A1 | 12/2003 | Cordelli et al. ................ 307/43 |
| 2006/0190745 A1 | 8/2006 | Matsushima et al. ........ 713/300 |
| 2008/0303484 A1 | 12/2008 | Lee et al. ...................... 320/134 |
| 2009/0289500 A1 | 11/2009 | Zipp et al. ...................... 307/31 |

OTHER PUBLICATIONS

Quadratic programming, available on Feb. 13, 2008 at http://en.wikipedia.org/wiki/Quadratic_programming.

* cited by examiner

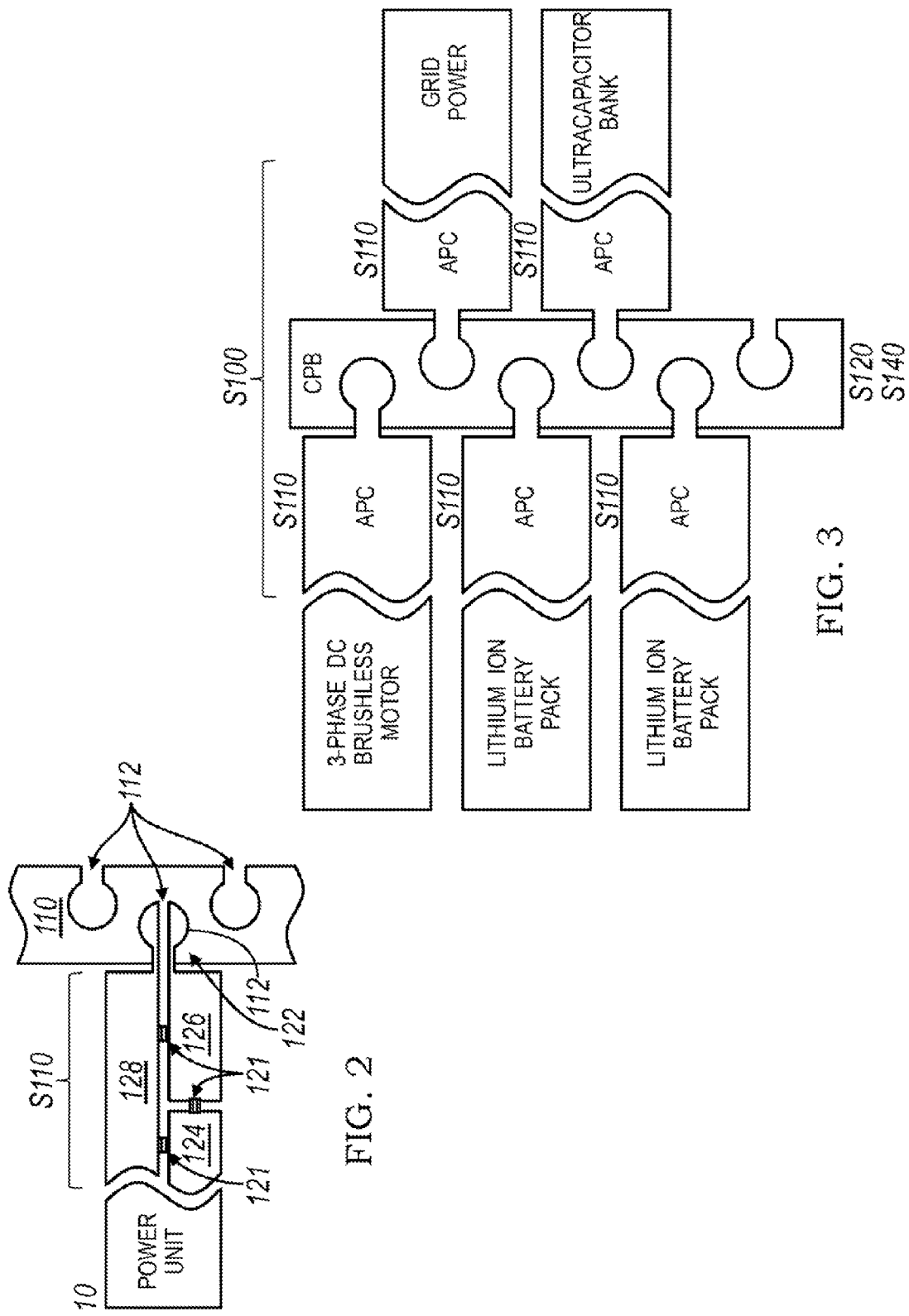

SYSTEM AND METHOD FOR MANAGING A POWER SYSTEM WITH MULTIPLE POWER COMPONENTS

CROSS-REFERENCE TO RELATED APPLICATIONS

This application is a continuation of, and claims the benefit under 35 U.S.C. §120 from, nonprovisional U.S. patent application Ser. No. 12/908,816, entitled "System And Method For Managing A Power System With Multiple Power Components", filed Oct. 20, 2010. U.S. patent application Ser. No. 12/908,816 claims the benefit under 35 U.S.C. §119 from provisional U.S. patent application Ser. No. 61/279,442, entitled "Networked Power Array", filed Oct. 20, 2009. This application incorporates by reference U.S. patent application Ser. No. 12/908,816.

TECHNICAL FIELD

This invention relates generally to the power system field, and more specifically to a new and useful system and method for managing a power system with multiple power components.

BACKGROUND

In conventional power systems with multiple power components (including power source components and power consumption components), the power systems include power electronics and control circuitry that function to manage the multiple power components. The power electronics may function to convert power between the power source components before use in the power consumption components and the control circuitry may function to communicate with each of the power components and to manage the power electronics. For example, electrical energy from a power source component (e.g., a battery or a generator) is typically converted from one voltage and current waveform to another by the power electronics and control circuitry before use in a power consumption component (e.g., a motor or any electrical load bearing device). In a more specific example, battery packs in an electric device such as an electric vehicle may provide direct current (DC) electrical power while the motor of the electric vehicle may require alternating current (AC). The power electronics may function to convert the DC electrical power into a varying-frequency AC electrical power to be used to power the motor of the electric vehicle.

In many applications, the power components within a system may be from different vendors. For example, a first battery pack may be sourced from a first vendor with a first set of operation parameters, power outputs, and/or communication parameters and a second battery pack may be sourced from a second vendor with a second set of operation parameters, power outputs, and/or communication parameters that are substantially different from the first set. Similarly, a motor may have substantially different power input parameters, operation parameters, and/or communication parameters from both the first battery pack and the second battery pack. The power electronics and control circuitry of conventional power systems are typically redesigned to accommodate for each new set of operation parameters, power outputs, and/or communication parameters. The custom-designed power electronics may be required to match the voltages and power levels of the new combination of interconnected power components. The custom-designed control circuitry may be required to coordinate the operation of the new combination of power components of the system. For example, in an electric vehicle, the desired amount of power provided to the power consumption component (e.g., the motor) may depend on the combination of power source components (e.g., batteries). If a new electric power consumption component or a new power source component is integrated into the system, new custom-designed power electronics and control circuitry may be required. This design process may be costly and may require a large amount of development and testing time.

Thus, there is a need in the multiple power component system field for a new and useful new and useful system and method for managing a power system with multiple power components.

BRIEF DESCRIPTION OF THE FIGURES

FIG. 2 is a schematic representation of the components of the adaptable connector of the preferred embodiments.

FIG. 3 is a schematic representation of the method of the preferred embodiments.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Overview

Figure 1A:
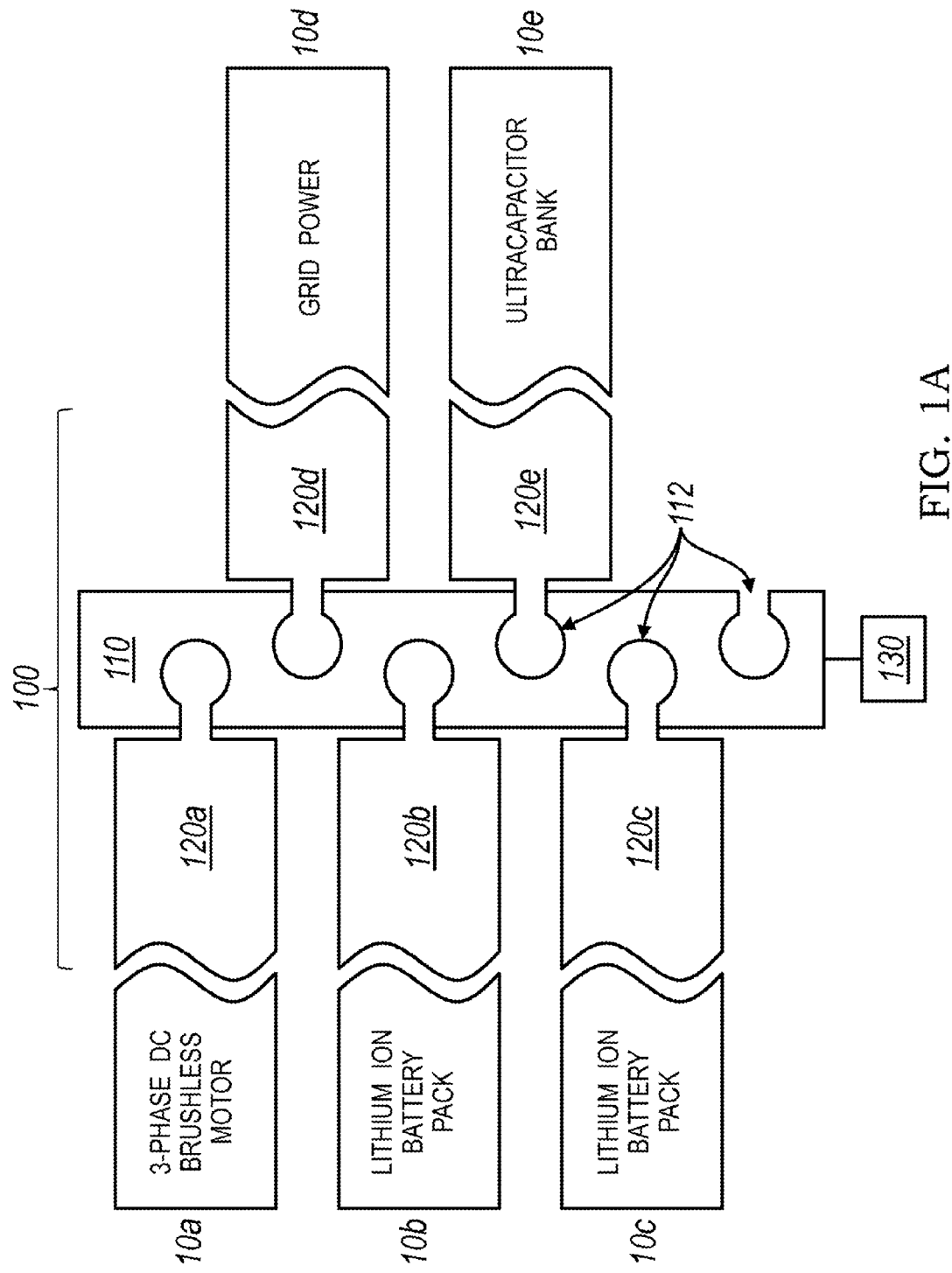
FIG. 1a is a schematic representation of the system of the preferred embodiments.

As shown in FIGS. 1 and 2, the system 100 for managing a power system with a plurality of power components 10 of the preferred embodiments includes a central power bus 110, a plurality of adaptable connectors 120 that each electrically couple to a power component and to the central power bus 110, and a control processor 130 that receives the state of each power component 10 from the respective adaptable connector 120 and is configured to balance the voltage and current between a power component that provides power and a power component that receives power based on the received states. Each adaptable connector 120 preferably includes a power bus connector 122 that interfaces with the central power bus 110, a power component connector 124 that interfaces with the power component, a processor module 126 that determines the state of the power component and communicates the state of the power component 10 to the central power bus 110, and a power controller 128 that regulates voltage and current flow between the central power bus 110 and the power component 10. The control processor 130 may be a central processor that is coupled to the central power bus 110 and communicates with each adaptable connector 120, but may alternatively be a distributed amongst each of the processors 126 of the adaptable connector 120, where each of the processors 126 of the adaptable connector 120 cooperate to balance the voltage and current output from each of the power source components. Alternatively, the control processor 130 may include a central processor and the processors 126 of at least a portion of the adaptable connector 120 and the central processor and the processors 126 may cooperate to balance the voltage and current output from each of the power source components. However, any other suitable arrangement of the control processor 130 may be used.

As shown in FIG. 3, the method S100 for managing a power system with a central power bus and a plurality of power components of the preferred embodiments includes the steps of electrically interfacing a power component to the central power bus through an adaptable connector that communicates with both the central power bus and the power component and monitors the state of the power component Step S110, balancing the voltage and current output from a power component that provides power to provide a desired power to a power component that receives power Step S120, receiving the state of each power component from the respective adaptable connector Step S130, and adjusting the balance of voltage and current flow to and from each power component based on the received states of each power component from the plurality of adaptable connectors Step S140.

The system 100 and the method S100 of the preferred embodiments allow dynamic adjustment and balancing of the voltage and current flow between the central power bus and each of the power components based on the states of each of the power components 10. This allows the system to quickly adjust to any changes in the state of the power components and/or the power components of the system. For example, in an electric vehicle, a power component 10 that receives power (or a power consumption component 14) may include a motor and a power component 10 that provides power (or a power source component 12) may include a battery. An input is received from the user of the vehicle that a burst of power is required (to quickly accelerate the vehicle). Because the states of each of the power source components 12 is known, the control processor 130 can quickly decide how much power to pull out from each power source component 12 that will (1) accommodate to the state of the power source component 12 (in particular, to output a level of power that will substantially maximize the life of the power source component and not cause the power source component 12 to fail), and will (2) provide a total power to the power consumption component 14 that is desired. The system 100 and the method S100 of the preferred embodiments also allow power components 10 to be replaced, removed, added, and/or updated with relative ease.

The adaptable connector 120 of the system 100 functions to communicate with both the power component 10 and the central power bus 110 and to "translate" communication between the power component 10 and the central power bus 110. This removes and relocates the component specific communication from the central power bus 110 to the adaptable connector 120 such that any design necessary to accommodate to a new power component 10 takes place within the respective adaptable connector, decreasing the need to redesign the central power bus 110 and/or the control processor 130, which may be substantially more complicated and/or expensive. The adaptable connector 120 also functions as the power "translator" that translates the power to a power component 10 from the central power bus 110 into power usable by the power component and translates the power from a power component 10 into power usable by the central power bus 110. The adaptable connector 120 also functions to monitor and report the state of the power component 10. Because the computation and/or sensing systems required in determining the state of each power component 10 may be different, this also decreases the computation burden and the communications requirements on the central power bus 110 and/or the control processor 130 to accommodate for each new power component 10. Additionally, this may allow an older central power bus and/or control processor 130 to accommodate to newer power components 10 without the need to reinstall and/or update the older components. In other words, in addition to translating communication between the power component 10 and the central power bus 110, the adaptable connector 120 also functions to simplify the data from each power component 10 into relatively simple states that are understandable by the central power bus 110 and/or the control processor 130. However, the system 100 and method S100 of the preferred embodiments may function to simplify the adaptation of and/or communication between power components 10 and the central power bus 110 and/or control processor 130 using any other suitable system and/or method.

The power components 10 of the system may function to receive power (or a power consumption component 14) and/or to provide power (or a power source component 12). The power components 10 may interchangeably provide and receive power (for example, a motor that receives electrical power to convert into work and provides power by converting work into electrical power), For example, an electric vehicle may include power components 10 that include batteries and a motor. When the electric vehicle is in use on the road, the batteries may function to provide power and the motor may function to receive power. However, as the electric vehicle brakes to decrease speed, the motor may function to provide power by converting work into electrical power, which may slow the vehicle through regenerative braking, and the batteries may function to receive the translated electrical power. When the electric vehicle is parked and connected to a power grid, the batteries may function to receive electric power from the power grid to charge the batteries, but may alternatively function to provide power to the power grid, for example, during high power usage times of the day. The control processor 130 preferably functions to detect when a power component 10 is providing power to appropriately change the balance of voltage and current flow within the power system. Alternatively, each power component may function only to receive power or to provide power. However, any other suitable arrangement of power flow in the power components 10 may be used.

Power components 10 that provide power may include any power component that can store, output, and/or generate energy, for example, a lithium ion battery, nickel metal hydride battery, a lithium polymer battery, capacitors, flywheels, a solar panel, a wind turbine, a motor, a power grid, or any other suitable power component that can provide power. Power components 10 that receive power may include a power component that performs a function (such as "work") when provided with power, for example, a motor, a displacement device, a pump, a display, a heat exchange system, or any other suitable type of device that performs a function when provided with power. Power components 10 that receive power may also be power storage or power redistribution components, for example, rechargeable batteries, or a power grid. However, any other the power components 10 may include any other suitable power component that receives and/or provides power. Each power component 10 preferably includes one unit of the power component (e.g., one battery pack), but may alternatively include a plurality of power components (e.g., a plurality of battery packs of substantially the same type or different type). Similarly, each power component may include multiple motors of substantially the same type or different type). The power components 10 may receive and/or output power in any suitable form, for example, alternating current (AC) or direct current (DC) and/or high voltage, low voltage, or any other suitable type of power.

The System of the Preferred Embodiments

As shown in FIGS. 1 and 3, the central power bus 110 of the system 100 functions to integrate the power components 10 of the system, and to transfer power between a power component 10 that receives power (a power consumption component 14) or a power component 10 that provides power (a power source component 12). As described above, the roles of receiving power and providing power may be interchangeable among the power components 10 of the system. The central power bus 110 also transfers power to the circuitry within the system, for example, the components of the adaptable connector 120 and/or the control processor 130. The central power bus 110 may also transfer communication between the adaptable connectors 120 and the control processor 130. The central power bus 110 includes a plurality of adaptable connector receivers 112, which function to interface with an adaptable connector 120 to communicate with and/or exchange power with the adaptable connector 120 and the power component 10. The adaptable connector receiver 112 may include a port that both communicates and exchanges power with the adaptable connector 120, as shown in FIGS. 1 and 2, but may alternatively include a port for communication and another port for power exchange with the adaptable connector 120. Preferably, each adaptable connector receiver 112 is substantially similar or identical to other adaptable connector receivers 112 of the central power bus 110 such that an adaptable connector 120 may be interchangeably interfaced with each adaptable connector receiver 112 based on the desired arrangement of the power components 10 within the system. Alternatively, the adaptable connector receivers 112 may include a first type of receiver for a first type of adaptable connector and a second type of receiver for a second type of adaptable connector. In this variation, the first type of receivers may be tailored for adaptable connectors for power source components and the second type of receivers may be tailored for adaptable connectors for power consumption components. Alternatively, the first type of receivers may be tailored for adaptable connectors for a first type of power source component and the second type of receivers may be tailored for adaptable connectors for a second type of power source component. However, any other suitable combination of variations in the plurality of adaptable connector receivers 112 may be used. The adaptable connector receiver 112 may be a female plug receiver and the power bus connector 122 may be a male plug that plugs into the female plug receiver, as shown in FIGS. 1 and 2. Alternatively, the adaptable connector receiver 112 may be a male plug that plugs into a female plug receiver of the power bus connector 122. However, the adaptable connector receiver 112 and the power bus connector 122 may be any other suitable arrangement and/or combination of male and female plug types.

The central power bus 110 preferably includes a power link that transfers power. The power link preferably transmits direct current (DC) power and may includes a pair of DC high-power cables with a capacitance in between the two DC high-power cables that may function to filter out high frequency noise and/or stabilize voltage within the high power cables, but may alternatively include a combination of high-power and low-power cables to both provide higher voltage power for power components and lower voltage power to the circuitry within the power system such as the components of the adaptable connector 120 and/or the control processor 130. For example, the power link may include a low-power cable that is referenced to a return high-power cable. Alternatively, the power link may function to transmit alternating current (AC) power. In this variation, the power link may include a pair of AC high-power cables, for example, two high-power cables for single phase AC power or three high-power cables for three-phase AC power. However, any other suitable combination of high-powers to transmit the desired type of AC power may be used. However, any other suitable arrangement of the power link may be used to transmit power through the central power bus 110.

The central power bus 110 also includes a communications link that functions to transfer communication, for example, state and control information. Preferably, the communications link is wired and includes wires that can transmit data. The wires may be fiber optic cables, but may alternatively be any other suitable type of data carrying wire. The wires may also include a plurality of wires, to form a communication cable such as an Ethernet cable, phone cable, or any other suitable type of multi-wire communication cable. Alternatively, the communications link may be wireless and may utilize wireless data transmitters that communicate, for example, through WiFi or Bluetooth technology. However, the communications link may transmit data using any other suitable system. The communications link may include a processor that complies to a communication protocol and link layer, such as the FlexRay™ protocol or a Controller Area Network (CAN) protocol. However, the communications link may utilize any other suitable type of communication protocol and link layer.

Figure 1B:
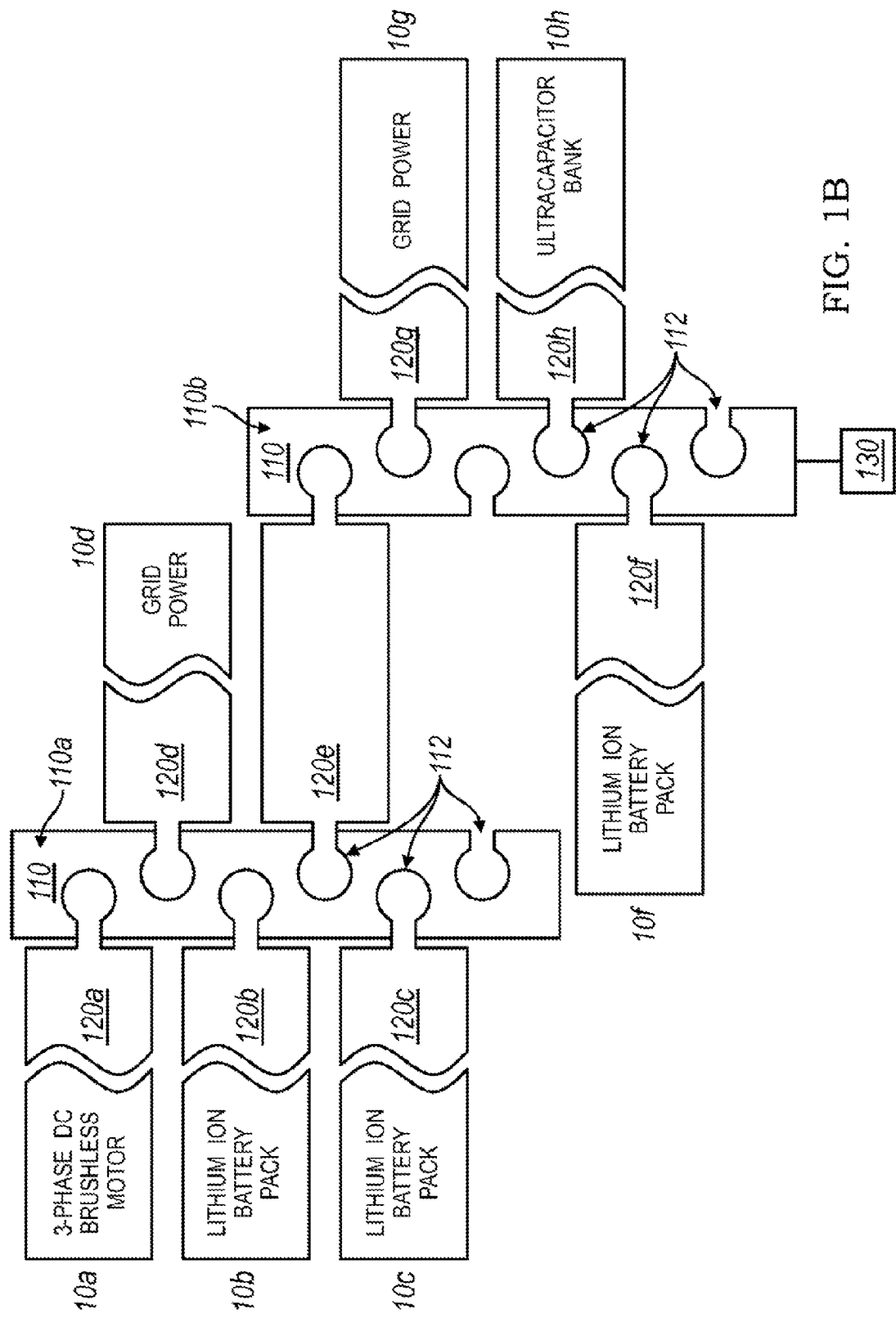
FIG. 1b is a schematic representation of a variation of the system of the preferred embodiments.

As described above, the adaptable connectors 120 of the system 100 function to collaboratively allow power components 10 that may each communicate differently and/or have different operation parameters to communicate and exchange power to the common central power bus 110. In other words, the adaptable connector 120 for each power component 110 functions to translate between the power component 10 and the central power bus 110, allowing, with little or no modification, a common central power bus 110 to continue to communicate and use each power component 10 even when each power component is substantially different and/or new power components 10 are introduced to the power system and when power components 10 are exchanged and/or removed from the power system. As shown in FIG. 1, the adaptable connectors 120 may be used in an electric vehicle and may function to connect a power component 10a such as a motor (power consumption component 14), power components 10b and 10c such as individual battery packs (power source components 12), power component 10d such as a grid power that can be used to charge the battery packs (power source component 12), and power component 10*e* such as a plurality of ultra-capacitors that store energy (power source component 12). Another example of an arrangement of power components 10 connected in a power system through the adaptable connectors 120 may include a plurality of solar panels connected to a central power bus 110, each through an adaptable connector 120, and another adaptable connector 120 that connects the central power bus 110 to an electrical grid and/or a battery to use and/or store the power generated by the solar panels. The adaptable connector may additionally function to translate and transmit power between a first central power bus 110*a* and a second central power bus 110*b* that communicates and/or operates differently from the first central power bus 110*a*, as shown in FIG. 1*b*. In other words, the power component in this variation may be the second central power bus 110*b* from the perspective of the first central power bus 110*a*. This may be particularly useful in an electric vehicle fleet where each electric vehicle includes an internal central power bus and each vehicle connects to a larger central power bus that charges portable power that is connected to the internal central power bus. However, this variation may be used towards another suitable arrangement and/or scenario of central power buses. In this variation, the adaptable connector may include a second power bus connector 122 that interfaces with the second central power bus 110*b*. The second power bus connector 122 may replace the power component connector 124, but may alternatively be an additional interface, thus allowing the adaptable connector to both interface with a power component and the second central power bus 110*b*. In this variation, the adaptable connector 120 may function to only translate communication, but may also function to both translate communication as well as control power exchange and/or convert power between the first and second central power buses 110*a* and 110*b*. A power component may also be connected to the central power bus 110 through more than one adaptable connector 120 for redundancy or to meet power requirements. For example, there may be two adaptable connectors 120 that couple a central power bus to an electrical grid because the connection between the central power bus and the electrical grid may be substantially important to the function of the power system. Alternatively, the connection to the electrical grid may require more power than can travel through a single connector, and may require two connectors. However, the adaptable connectors may be of any other suitable number within the power system and may function to connect any other suitable type of power component 10 to the power system.

The adaptable connectors 120 of the system 100 also preferably function to monitor the state of the connected power component 10 and report the state to the control processor 130, which then determines the amount of power (voltage and/or current output) to use from each power source component to collectively provide a desired total power to a power consumption component (or the voltage and/or current input into a power storing power source component from a power generating power consumption component). Each adaptable connector 120 preferably includes a power bus connector 122 that interfaces the adaptable connector 120 to the central power bus 110 (preferably through the adaptable connector receiver 112), a power component connector 124 that interfaces with the power component, a processor module 126 that determines the state of the power component and communicates the state of the power component 10 to the central power bus 110, and a power controller that regulates voltage and/or current flow between the central power bus 110 and the power component 10.

The power bus connector 122, the power component connector 124, the processor module 126, and the power controller 128 preferably each include connectors 121 that allow each component of the adaptable connector 120 to communicate with another, as shown in FIG. 2. In particular, the power component connector 124 preferably interfaces with the power controller 128, which then interfaces with the power bus connector 122. The processor module 126 preferably also interfaces with the power controller 128 to retrieve information regarding the power component 10 and/or to pass power information from the control processor 130, and preferably interfaces with the power bus connector 122 to communicate the state of the power component 10 to the central power bus 110. The processor module 126 may also interface with the power component connector 124 to determine the state of the power component 10, but may alternatively interface with sensors that facilitate in the determination of the state of the power component 10 (as described below). The connector 121 is preferably a wired combination of a male and female plug system, but may alternatively be any other suitable type of connector. Each interface connector 121 may be of substantially the same type, but may alternatively be different. For example, the interface connections between the power controller 128 and the power component connector 124 and the power bus connector 122 may be wired while the interface connection between the power controller 128 and the processor module 126 may be wireless. However, any other suitable type of connector that allows for the suitable communication and/or power transfer between the components of the adaptable connector 120 may be used.

Figure 4B:
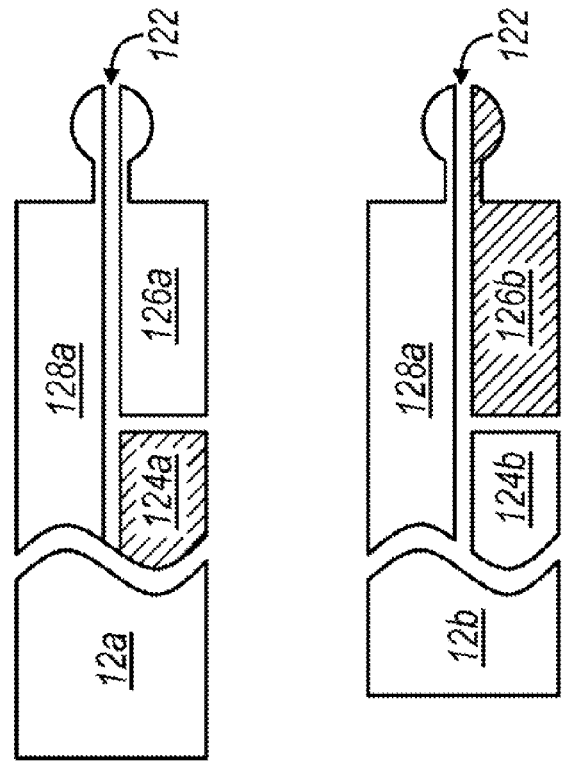
FIG. 4 includes FIG. 4a and FIG. 4b which are schematic representations of a variety of combinations of the components within the adaptable connector of the preferred embodiments.
Figure 4A:
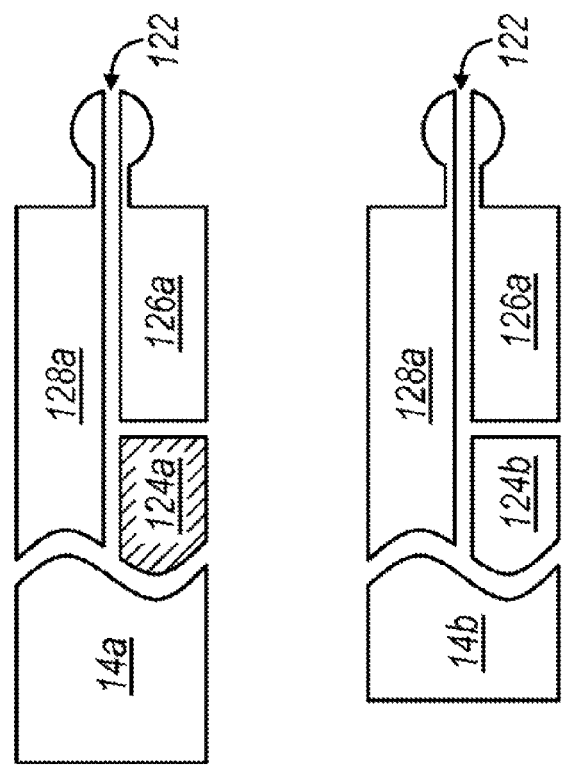

The connectors 121 in between the components of the adaptable connector are preferably standard for each interface such that, for example, a new power controller 128 made for a new power component 10 may interface with an older power component connector 124, and/or an upgraded processor module 128 may substantially easily interface with an older power component connector 124 and/or power bus connector 122. Alternatively, common connections may allow for different types of each component to be switched in and out substantially easily, for example, to improve the design of the adaptable connector for a particular power component 10. For example, as shown in FIG. 4*a*, a first power component connector 124*a* may be used for a motor of type A (power consumption component 14*a*) and a second power component connector 124*b* may be used for a motor type B (power consumption component 14*b*) while other components remain the same. Similarly, as shown in FIG. 4*b*, a first power component connector 124*a* and processor module 126*a* may be used for a battery pack of type A (power source component 12*a*) and a second power component connector 124*b* and processor module 126*b* may be used for a battery pack of type B (power source component 12*b*) while other components remain the same. However, any other suitable arrangement of the connectors may be used.

Figure 5:
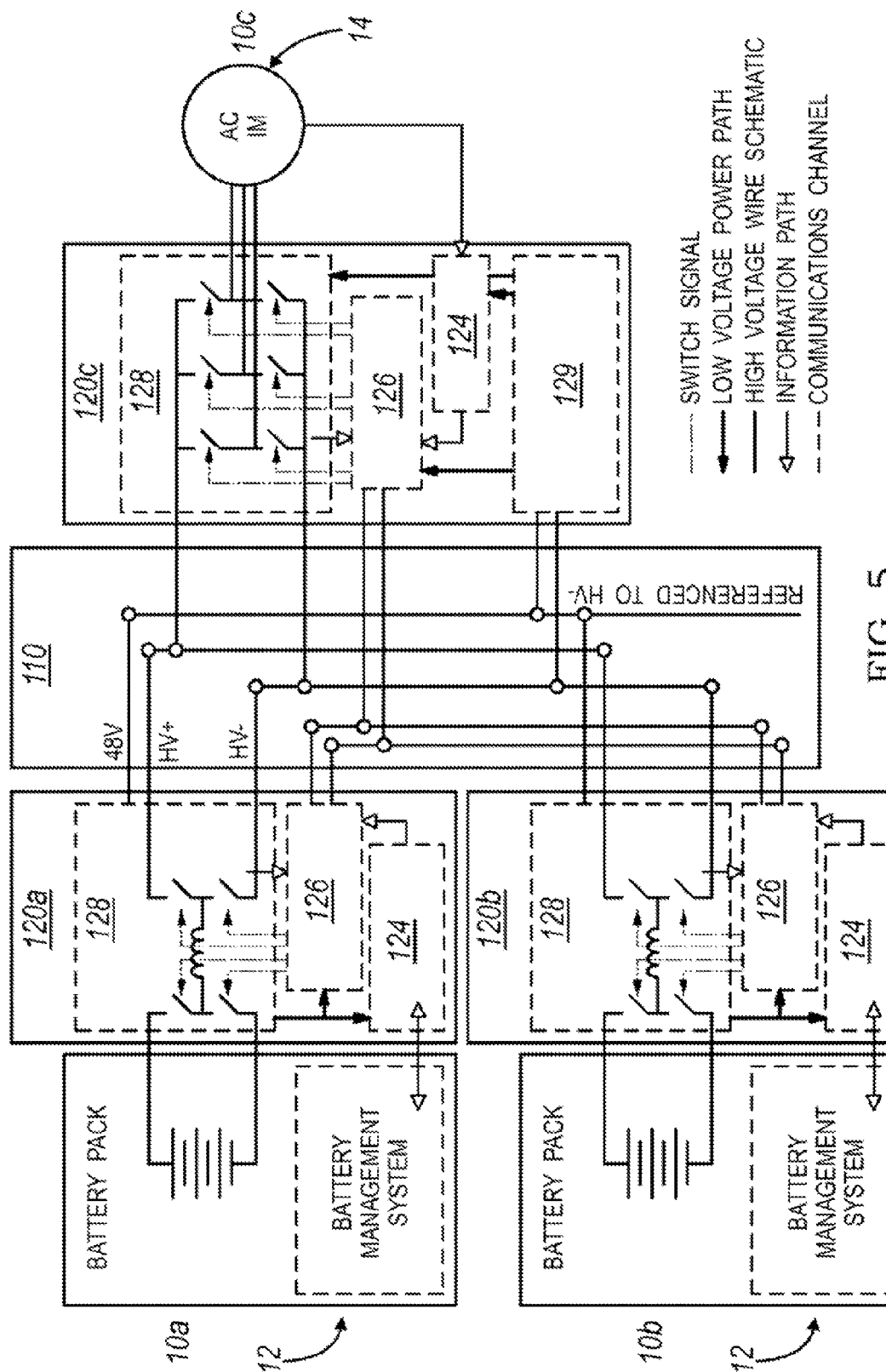
FIG. 5 is a schematic representation of the electrical components within the system of the preferred embodiments.

The adaptable connector 120 may alternatively also include a power distribution module 129 (as shown in FIG. 5) that functions to supply operating power to other adaptable connectors. For example, the power distribution module in an adaptable connector 120 may function to take power from the attached power component 10 to distribute power through the central power bus 110 to other adaptable connectors 120. This may be particularly useful where the components (such as the processor module 126) of the adaptable connectors 120 may use lower voltage power while other power components 10 that receive power use higher voltage power.

The power bus connector 122 functions to interface the adaptable connector 120 to the central power bus 110 (preferably through the adaptable connector receiver 112). As described above, the adaptable connector receiver 112 and the power bus connector 122 may be an arrangement of male and female plug types. The power bus connector 122 preferably includes a data connection to the processor module 126 and a power connection to the power controller 128 and functions to relay data from the processor module 126 (for example, regarding the state of the power component 10) to the central power bus 110 and to transfer power from the power component 110 through the power controller 128 to the central power bus 110. By allowing the power bus connector 122 to interface with both the processor module 126 and the power controller 128, one connector may be used to interface the adaptable connector 120 with the central power bus 110. Alternatively, the power bus connector 122 may be integrated into the processor module 126 and the power controller 128. For example, each of the processor module 126 and the power bus connector 122 may include an interface that substantially directly connects to the central power bus 110 without interfacing with another component. However, any other suitable arrangement of the power bus connector 122 may be used.

The power component connector 124 functions to communicate information and power between the power controller 128 and the power component 10. The power component connector 124 may also function to communicate information between the processor module 126 and the power component 10. The power component connector 125 is preferably a substantially permanent connector that maintains contact between the power component 10 and the adaptable connector 120 throughout the useful life of the power component 10. Alternatively, the connector 121 may be a wired combination of a male and female plug system, but may alternatively be any other suitable type of connector. In the variation where the processor module 126 utilizes sensors to determine the state of the power component, the power component connector 124 preferably connects the sensors to the power component 10. However, the power component connector 124 may function to connect any other suitable portion of the adaptable connector 120 that allows for power flow to and/or from the power component 10 and/or determination of the state of the power component 10.

The processor module 126 functions to determine the state of the power component 10. The processor module 126 may also function to interpret communication from the control processor 130 regarding the power flow between the power component 10 and the central power bus 110 and/or communicate the power flow information to the power controller 128. The processor module 126 may also function to communicate with central power bus 110 and may retrieve operation parameters for the power component 10, for example, the speed at which to run a power component that is a motor. The processor module 126 may include a microprocessor and memory storage that contains software to determine the state of the power component 10 and control the power flow between the power component 10 and the central power bus 110 through the power controller 128 by communicating to the power controller 128 instructions based on the determined power flow. The processor module 126 may also function to prevent power flow from the power component 10 through the adaptable connector 120 when the adaptable connector 120 is not connected to a central power bus 110. Similarly, the processor module 126 may also function to allow power flow after connection of the adaptable connector 120 to the central power bus 110 only after the connection is validated, for example, through a handshake process. This may help prevent a power component 10 from being connected incorrectly to a central power bus 110. Similarly, the processor module 126 may function to prevent power from flowing between the power component 10 and the central power bus 110 when an error state is detected, for example, within the power component 10 or the central power bus 110. The software contained in the memory storage may preferably be updated as necessary. As described above, the processor module 126 may be interchangeable between different adaptable connectors 120.

The processor module 126 functions to determine the state of the power component 10 by monitoring an operation parameter of the power component 10. The operation parameter may be a measurable parameter (for example, temperature, voltage, position, or current), but may alternatively be a calculated parameter (for example, state of charge, remaining operation time, or projected power generation capability). The state is evaluated periodically during the use of the power component to provide substantially real time updates to the control processor 130 regarding the state of the power component 10 such that control processor 130 may adjust the management of a particular power component 10 on a substantially real time basis, increasing the efficient use of each power component 10 at any one time. The determined state of the power component 10 may include information on whether the power component 10 is functioning normally (or, in other words, if the power component is "healthy") or abnormally (or, in other words, if the power component is "unhealthy") based on the operating parameters of the power component. Each state may include a plurality of degrees, for example, a power component may be reported as very healthy, healthy, borderline healthy, slightly unhealthy, unhealthy, and/or very unhealthy. A power component that is reported as very unhealthy may be close to failure and/or in need of replacement and/or maintenance. Alternatively, the health of a component can be reported in a continuous manner such as a state of health that is represented by a real number with value between 0.0 and 1.0, where 0.0 represents very unhealthy and 1.0 represents very healthy. However, any other suitable number or type of health state may be reported. Alternatively, the determined state of the power component 10 may include more detailed information, for example, the position of the rotor of a motor or the remaining charge within a battery. For a power component such as a battery, the processor module 126 preferably monitors the temperature, temperature gradient within the battery pack (for example, the difference between the coldest and hottest cell), heat generated by the battery pack, heat rejected by the battery pack, state of charge, current, internal impedance, or any other suitable operation parameter of the battery. For a power component such as a motor, the processor module 126 preferably monitors the temperature (for example, of the rotor and/or the stator of the motor), the magnetic flux, the rotor speed, rotor position, or any other suitable operation parameter of the motor. For a power component that includes a heat exchange system, the processor module 126 preferably monitors the temperature of the system, for example, the inlet and outlet temperatures of a coolant. Operation parameters are preferably detected through sensors that are coupled to the power component 10. Sensors may include temperature sensors, position sensors, current sensors, voltage sensors, or any other suitable type of sensor. The processor module 126 may also include analog to digital converters that can convert analog sensor signals into digital signals that may be interpreted by the microprocessor. However, any other suitable sensors may be used. To determine operation parameters that are calculated, the software stored in the memory storage preferably utilizes measurable parameters to calculate the desired parameters. However, any other suitable method to determine an intrinsic quality of the power component may be used.

The processor module 126 may determine the state of the power component 10 using one of a variety of methods. In a first variation, the memory storage of the processor module 126 preferably also functions to store historical operation data of the power component 10 that is used to determine and/or estimate the state of the power component 10. As data is taken and analyzed in real time on the operation parameters of the power component 10, the processor may compare the most current data to historical data to determine whether abnormal activity is detected, for example, if the most current data is of an expected value based on the recorded historical performance of the power component. In a second variation, the memory storage of the processor module 126 may store a threshold value for a particular operation parameter (e.g., maximum temperature or minimum state of charge) and when the most current data is beyond the threshold value, abnormal activity is determined. In this variation, the threshold values may be stored in the control processor 130 and the processor module 126 may function to report the actual operation parameter for the control processor 130 to evaluate relative to the threshold value. However, any other suitable method and/or parameter may be used to determine the state of the power component 10.

The power controller 128 functions to regulate voltage and current flow between the central power bus 110 and the power component 10. As described above, the power controller 128 is preferably interchangeable between adaptable connectors 120. The power controller 128 may also function to assist the processor module 126 in determining the state of the power component 10, for example, if the power controller 128 detects any abnormal power fluctuations from the power component 10. The power controller 128 preferably receives instructions from the control processor 130 (or through the processor module 126) on the power flow and regulates the voltage and current flow based on the instructions. Each adaptable connector 120 preferably includes one power controller 128 for each power component 10, but may alternatively include multiple power controllers 128 for the power component 10 in an adaptable connector 120. For example, in the variation of the power component 10 that includes multiple units, for example, multiple battery packs, the adaptable connector may include a power controller 128 for each unit. This may be particularly useful where the available power controller 128 design is rated for a power level that is lower than the desired power level, and the power component 10 cannot be split into a plurality of units that each have their own adaptable connector 120. In this arrangement, a plurality of available lower power type power controllers 128 may be used in a single adaptable connector 120, resulting in the desired power level for the adaptable connector 120 and power component 10 without splitting the power component 10. Such a situation may arise when only one power controller 128 design is available, a particular power controller 128 is more cost effective, a particular power controller 128 is easier to implement, and/or any other reason. This may also be particularly useful in cases where a battery pack with a desired power output and with a desired voltage output cannot be found and, instead, a battery pack that may have a desired power output but with a lower than desired voltage output is found. A plurality of these suitable battery packs may be connected together in series (or in a series parallel combination) to produce the desired voltage output. The combined battery packs may be electrically coupled and controlled by one power controller 128, but alternatively, the battery packs may each be connected to a dedicated power controller 128, where the power controllers 128 may be arranged in a series, parallel, or any other suitable type of connection within the adaptable connector 120. This may allow for more accurate control of each battery pack and/or more accurate determination of the state of each battery pack. However, any other suitable arrangement of the power controller 128 within the adaptable connector 120 may be used.

Figure 6:
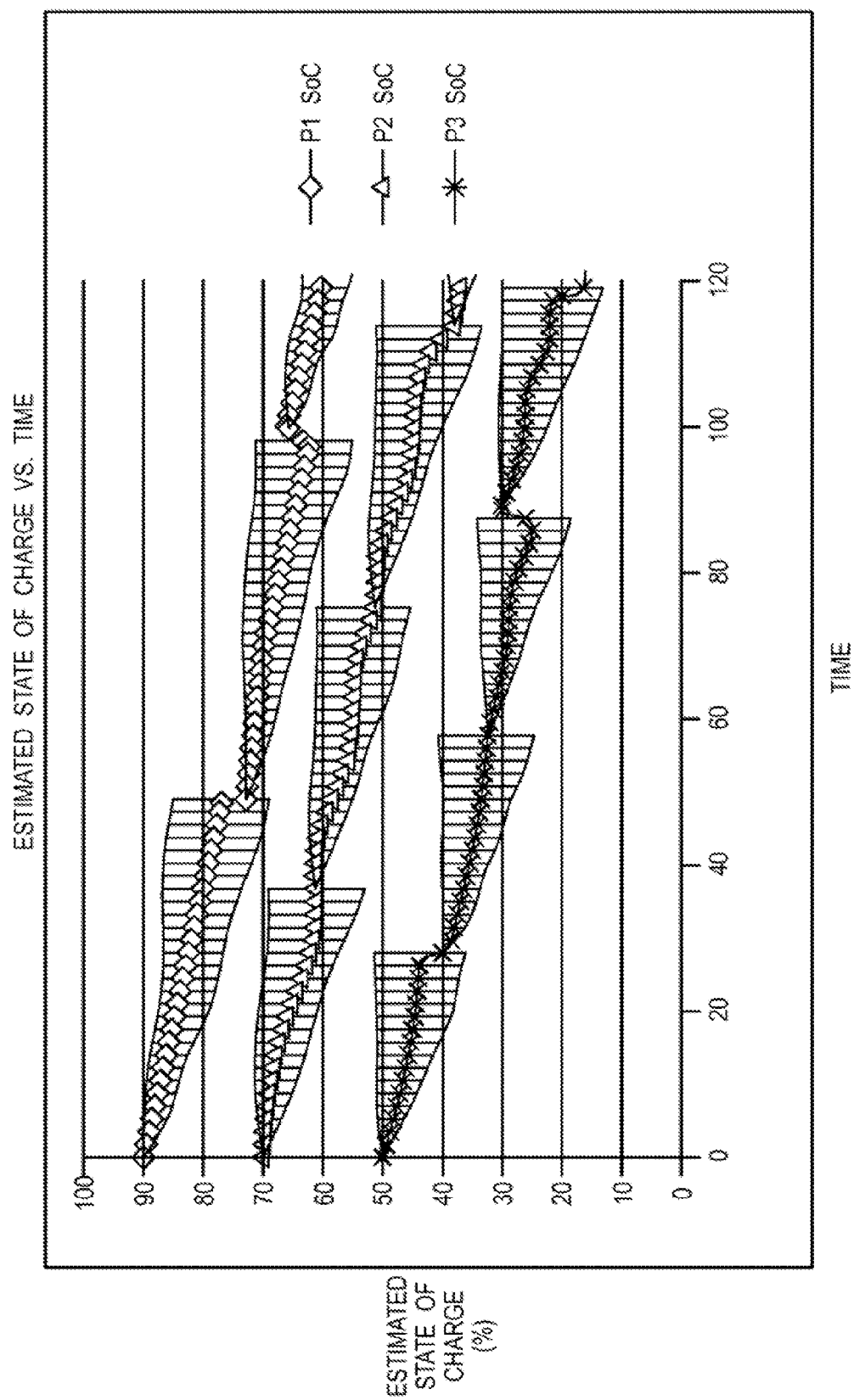
FIG. 6 is a graph representing the increasing error in state of charge (SoC) measurements with time and use of a recalibration method of the preferred embodiments.
Figure 7:
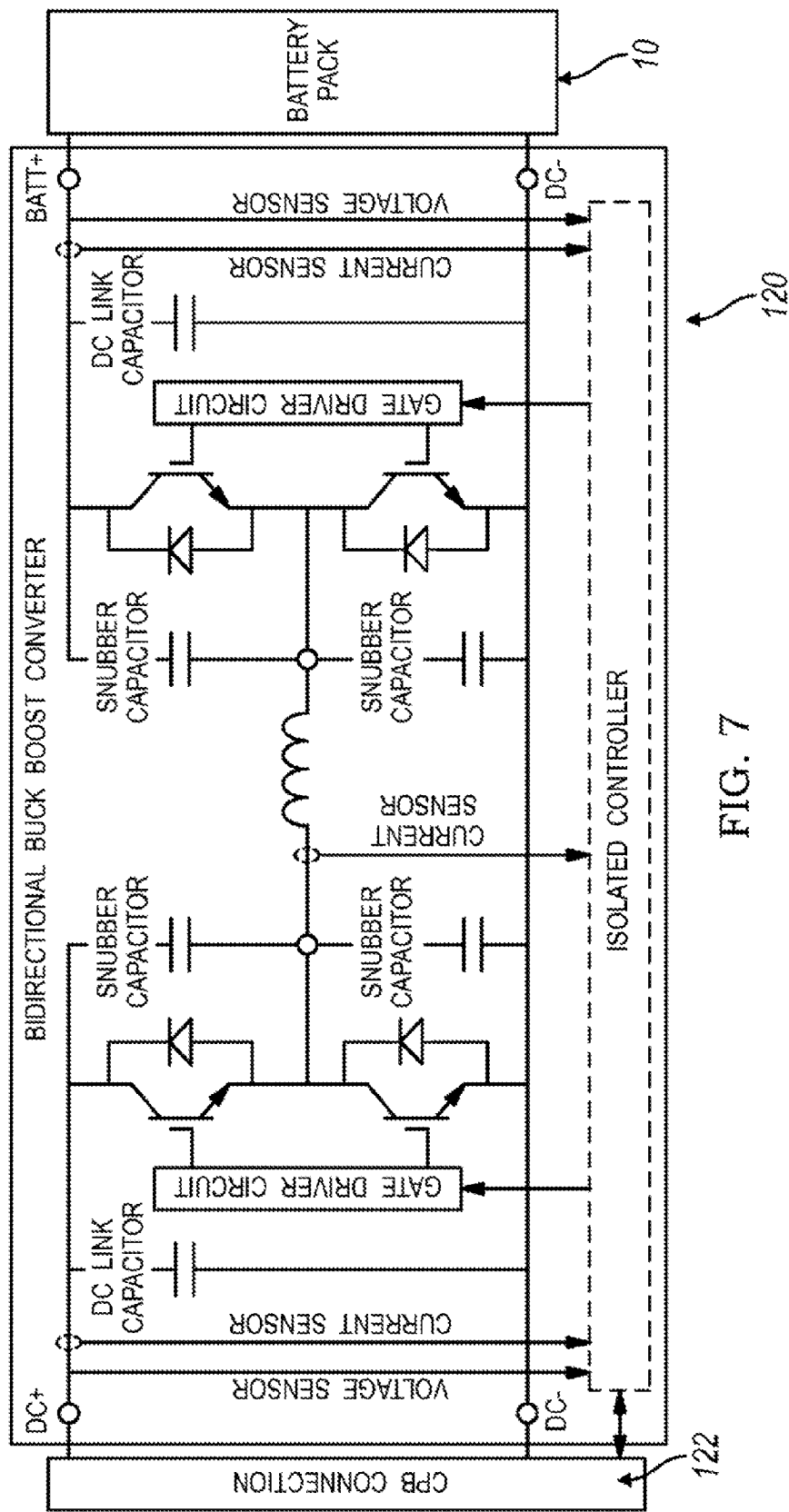
FIGS. 7 and 8 are schematic representations of variations of the electrical components within the adaptable connector.
Figure 8:
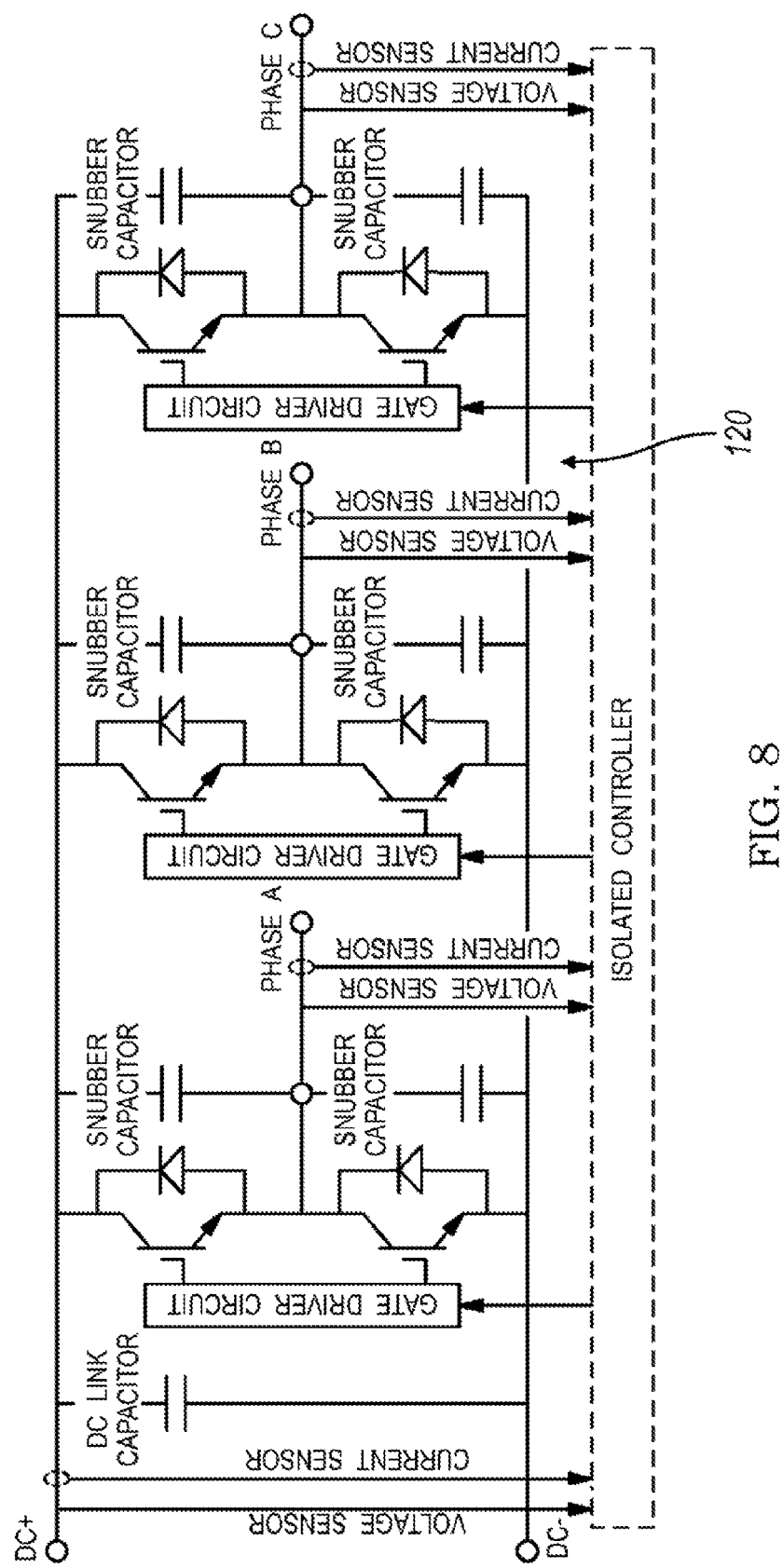

The power controller 128 preferably includes a plurality of switches and electrical components that cooperate to control and/or convert the power flow between the power component 10 and the central power bus 110, for example, a variable direct current link, as shown in FIGS. 5, 7, and 8. The combination of switches and/or other electrical components are preferably tailored to the type of power component 10 that is to be interfaced, for example, a battery or a motor and preferably function to convert power from a power component 10 that is usable by the central power bus 110 or to convert power from the central power bus 110 that is usable by the power component. The power controller 128 may also function to convert power from the central power bus 110 to power the components of the adaptable connector. The switches may cooperate to form power converters that are suitable for the type of power component 10 that is to be interfaced, such as a three-phase bridge or a buck converter, which are known in the art. The switches may be MOSFET switches, physical switches, or any other suitable type of switch. The electrical components may include transformers, amplifiers, inductors, capacitors, or any other suitable type of component that manipulates power. However, the power controller 128 may include any other suitable component arranged in any other suitable way to regulate the power flow between the power component 10 and the central power bus 110, as shown in FIGS. 5, 6 and 7.

The adaptable connector 120 of the system 100 of the preferred embodiments is preferably of a variation described above. Alternatively, the components of the adaptable connector 120 may be combined into a singular structure, for example, a printed circuit board that accomplishes both the functions of the power controller 128 and the processor module 126. However, any other suitable arrangement of the adaptable connector 120 may be used.

The control processor 130 functions to receive the state of each power component 10 from the associated adaptable connector 120 and to determine the power flow between each power component 10 and the central power bus 110 to balance the voltage and current between a power component that receives power and a power component that provides power and to adjust the balance based on received state information. The control processor 130 preferably detects when a power component 130 is providing power and functions to appropriately balance the voltage and current flow within the power system. For example, when a motor in an electric vehicle applies regenerative braking and causes a current to flow into the central power bus 110 from the motor, the control processor 130 preferably detects the current flow and manages the power input from the motor and directs it towards power components 10 that receive power (e.g., the batteries) based on the state of those power components 10 that receive power. The control processor 130 preferably functions to determine the voltage and current output from a power component that provides power (a power source component 12) based on the state of each power source component 12. The control processor 130 preferably also functions to determine the voltage and current input into a power component that receives power (a power consumption component 14) based on the received state of the power consumption component 14. For example, if the power consumption component 14 is determined to be overheating and the desired power to be provided to the power consumption component 14 may further increase the overheating of the power component 10, the control processor 130 may decrease the power provided into the power consumption component 14 to protect the power consumption component 14 from further overheating.

The control processor 130 may also function to receive instructions from an external source regarding the amount of power desired at the power consumption component 14. For example, in the variation where the system 100 is used in an electric vehicle, the control processor 130 may receive instructions on how much power is required of the motor (power consumption component) of the electric vehicle. In the variation where the system 100 is used in a power generation system such as one with a plurality of solar panels (power source component) and storage batteries (power consumption component), the control processor 130 may receive instructions on the goal for how much power to store in each of the storage batteries. The instructions may be provided by an operator of the system, for example, the driver of the electric vehicle, but may alternatively be informed from a database, for example, based a database of information on day to day characteristics of the sun on a particular day, a goal for amount of solar power generated may be provided from the database to the control processor 130. The instructions may also be determined by control processor 130, for example, the control processor 130 may monitor environmental conditions such as the ambient temperature and/or the ambient pressure, and based on the measured environment conditions, the control processor 130 may determine appropriate operating conditions (for example, from a database of appropriate operating conditions based on environment conditions). However, the control processor 130 may receive any other suitable type of instruction.

The states and/or instructions may be received by the control processor 130 all at one time, but may alternatively be received in a set pattern or "schedule." In a first variation, the control processor 130 may recognize the power components 10 attached to the central power bus 110 and/or any other external command component that is also attached to the central power bus 110. Upon recognition, the control processor 130 may assign a time for the component to "report" either the state or instruction to the control processor 130, for example, every two minutes starting at a particular time. In a second variation, the control processor 130 may assign an order to the components, for example, the power consumption component reports after the power source component reports. In a third variation, the control processor 130 may assign a ranking to the components. For example, if a state of a particular component has a tendency to change more rapidly than another, such as instructions from a driver of a vehicle compared to the state of the ventilation system of the vehicle, the rapidly changing component may be given priority in reporting state and/or instruction. By scheduling communication from each component over the central power bus 110, the communications link of the central power bus 110 may be kept open to allow desired information to be transferred. If all communication signals were to be transmitted at one time, bandwidth of the communications channel may not be used effectively, or a priority inversion may occur, decreasing the efficiency of the communication and, subsequently, the control of the system. However, any other suitable scheduling of communication may be used.

The control processor 130 functions to balance the voltage and current output from each power source component 12 to provide a desired power to a power consumption component 14 based on the received states of each power component 10. Each power component 10 may include a "healthy" state and an "unhealthy" state. In this variation, the step of balancing the voltage and current from each power source component 12 to provide a desired power to a power consumption component 14 preferably includes decreasing the voltage and/or current output from an "unhealthy" power source component 12 and increasing the voltage and/or current output from a "healthy" power source component 12 to compensate for the decreased power from the "unhealthy" power source component 12 to provide the desired power to the power consumption component 14. The control processor 130 may increase the voltage and/or current output from one other power source component 12, but may alternatively increase the voltage and/or current output from more than one power source component 12. Compensating the decrease in power output from one power source component by increasing power output from more than one power source component may spread the burden across multiple power source components and may decrease the degradation of the power source components. In determining the amount of power output increase for a compensating power source component, the control processor 130 preferably also take into account the state of the compensating power source component. For example, to compensate for the decreased power output of another power source component, the power output of a first power output component may be increased by a first amount and the power output of a second power source component may be increased by a second amount less than the first amount if the second power source component is reported to be less "healthy" than the first power source component. However, any other power arrangement among the power components 10 based on the reported health state may be used.

The control processor 130 may also function to control the power flow outside of normal operating parameters between a power component 10 and the central power bus 110 to recalibrate measurement of an operation parameter or estimation of the state of the power component 10, for example, to substantially stop power flow. In this variation, the control processor 130 may cooperate with the processor module 126 of the adaptable connector associated with the power component to determine the timing for a recalibration function. Alternatively, the processor module 126 may communicate with the control processor 130 that calibration is needed, for example, the processor module 126 may report a "recalibration" state to the control processor 130. Because the processor module 126 is designed for the power component 10 and may be better suited to operate calibration of the power component, the power flow to and/or from the power component 10 during calibration may be controlled by the processor module 126 and the control processor 130 may function to monitor the power flow and balance the overall power within the central power bus 110 using the other power components 10 in the system. However, any other suitable control and/or method of carrying out calibration may be used. For example, to measure the state of charge in a battery during use, a current sensor may be used to determine the amount of charge that is entering or exiting the battery pack. This measurement may be coupled with a voltage measurement at a particular time that is used with the measured current of the battery pack and the type of the battery pack to determine the state of charge (S0C) of the battery pack. However, as use time increases, the accuracy of the state of charge (S0C) measurement is decreased, as shown in FIG. 6. The control processor 130 (or the processor module 126) may recalibrate the state of charge measurement by decreasing the power output of the battery pack to substantially zero such that the voltage measurement of the battery pack is substantially identical to an open circuit voltage, which may be used to provide a much more accurate measurement of the state of charge within the battery, as shown in FIG. 6. Alternatively, the power output of the battery pack may be increased and decreased in a known pattern to increase the accuracy of an estimation of the internal impedance of the battery pack. However, any other suitable method to calibrate a measurement of an operation parameter of the power component 10 may be used.

The control processor 130 is preferably a central processor that communicates with each adaptable connector 120 of the power system. Alternatively, the control processor 130 may be distributed into a portion or all of the processors 126 of the plurality of adaptable connectors 120, as described above, such that the adaptable connectors 120 may collaboratively perform power management of each of the power components 10. For example, each adaptable connector 120 reports the state of the associated power component 10 to the other adaptable connectors 120 that include processors 126 that are involved in the power management of the system. Based on the received states of the power components 10, the adaptable connectors 120 may cooperatively determine the amount of power (voltage and/or current output) from each power source component 12 to use to contribute toward a desired total power to the power consumption components 14. In an example of this variation, the adaptable connector 120 of a first power source component 12 may determine that the state of the associated power source component is low charge. Based on this state, the adaptable connector 120 may determine a preference for providing less power to the central power bus 110 and allowing other power source components 12 to compensate for the low power output of the associated power source component 10. However, the states of other power source components 12 are reported to the adaptable connector 120 as also being of low charge. As a result, the adaptable connector 120 determines to allow the associated power source component 12 to provide a higher power output so that the other power source components 12 in the system are not overburdened. However, any other suitable method of cooperative power determination may be used.

Exemplary Arrangements of the Power System

As described above, the system 100 and method S100 of the preferred embodiments may be used with a plurality of different combinations of power components through the different available designs of the adaptable connector 120.

In a first specific example of an adaptable connector, the power component 10 is an induction machine such as a 300 kW alternating current induction machine (Or motor). In this example, the adaptable connector 120 may include a power controller 128 that includes a three-phase switching converter that connects to the high power lines of the central power bus. A substantially similar power controller 128 may also be used in connecting a 300 kW permanent magnet synchronous machine or to any other 300 kW power components that can be regulated by a three phase bridge, as shown in FIG. 8, and the processor module 128 may include a microprocessor to control the power controller 128 and/or the induction machine based on information from the central power bus 110 and/or the control processor 130. The information may include the desired torque, the desired speed, the state of other power components connected to other adaptable connectors in the system, or any input from some other interface or component connected to the central power bus 110 which may include a gas pedal, button, LCD screen, computer, or computer terminal. The microprocessor is coupled to the power controller 128 in a way such that signals from the microprocessor may control the switching devices of the power controller 128. The software in the memory of the processor module 126 may implement an algorithm such as field-oriented control to control the AC induction machine and determine the state of the AC induction machine. The power component connector 124 may also connect a rotor position sensor to the processor module 126. In the variation where the adaptable connector includes a power distribution module, the power distribution module may include a buck converter with isolation transformer to step down power from the central power bus 110 and provide regulated low-voltage power to the other components of the adaptable connector 120.

In a second specific example, the power component is a battery such as a 40 kW battery pack. In this example, the power controller 128 of the adaptable connector 120 may include power electronics circuitry including the switching devices, inductors, and capacitors of a bidirectional buck-boost converter, as shown in FIG. 8. The power controller 128 of this example may be interchangeable with other adaptable connectors that connect to a 40 kW ultracapacitor or any other 40 kW power device that can be regulated by a bidirectional buck-boost converter. The processor module 126 may include a microprocessor to control the power controller 128 and/or the induction machine based on information from the central power bus 110 and/or the control processor 130. The information may include the desired current, or the desired voltage, and/or the state of other power components connected to other adaptable connectors 120. The microprocessor is connected to the power controller 128 such that signals from the microprocessor may control the switching devices of the power controller 128. The software of the processor module 126 implements an algorithm for tracking the state of charge of the battery pack and communicates the determined state to the central power bus 110. The processor module 126 may also receive information from the power controller 128 regarding the desired current, voltage, and/or the temperature of the power component 10.

Figure 9:
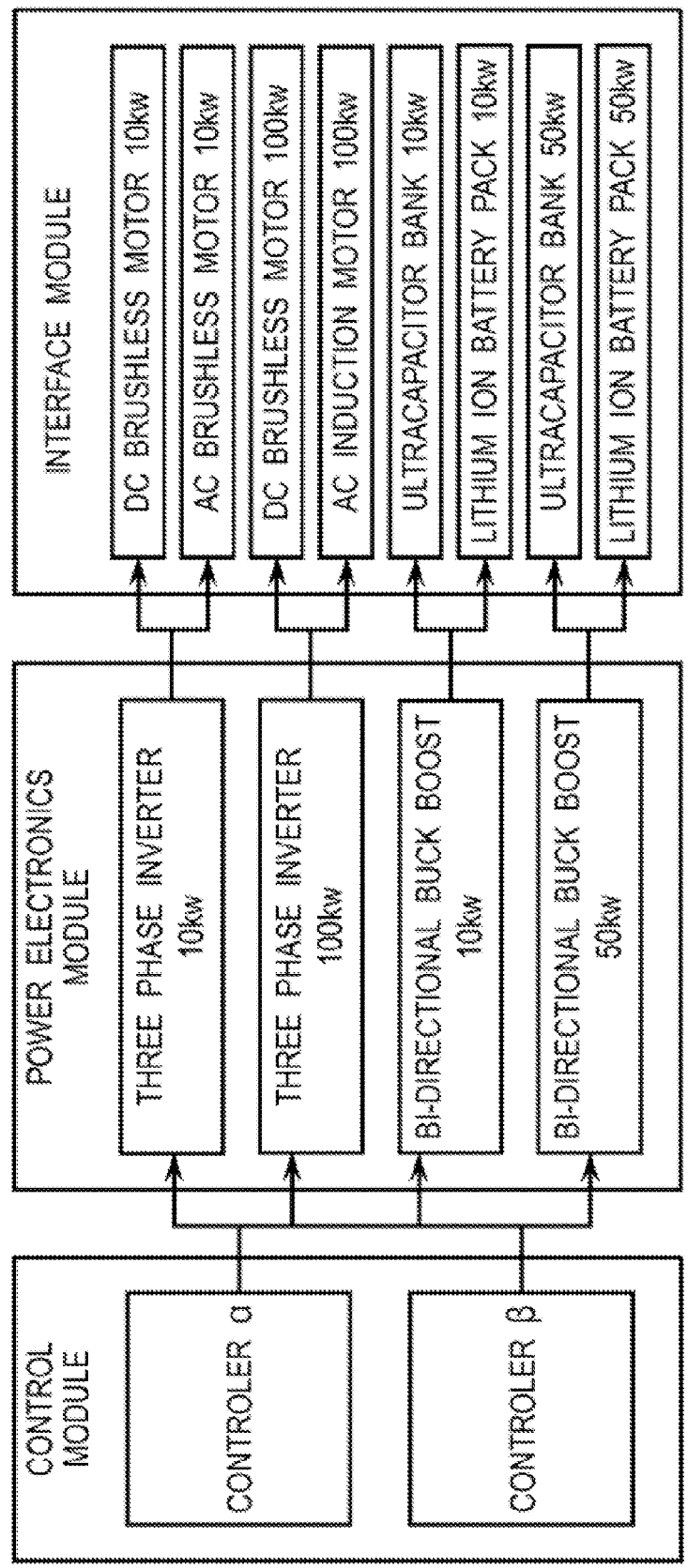
FIG. 9 is a schematic representation of a library of designs for the components of the adaptable connector that may be used to build an adaptable connector for a particular power component.

As described above, the adaptable connector may be one of a multitude of combinations of components that allow the adaptable connector to adapt to a variety of power components. The designs of the components of the adaptable connector may be stored within a collection or a library that may be referenced to put together an adaptable connector that is adapted to a particular power component 10. The library may also include pre-combined variations of components for a particular type of power component 10 that may be referenced. The library of adaptable connector 120 designs preferably includes designs for a range of power levels of power components 10 as well as different classes of power components, for example, as shown in FIG. 9.

Classes of power components may include AC induction machines, brushless DC machines, ultracapacitor banks, and lithium-ion battery packs and power range. Power level ranges may include 0-10 kW, 0-100 kW, and 0-200 kW. However, the library may include any other suitable type of information.

As a person skilled in the art will recognize from the previous detailed description and from the figures and claims, modifications and changes can be made to the preferred embodiments of the invention without departing from the scope of this invention defined in the following claims.

We claim:

1. A system comprising:
   a power bus;
   a plurality of adaptable connectors, wherein each of the adaptable connectors is coupled to a power component and to the power bus, wherein at least two of the adaptable connectors control a voltage of the power bus, and wherein each of the adaptable connectors comprises:
     a processor that determines a state of the power component, wherein the state of the power component is taken from the group consisting of: a State of Health (SoH) of the power component, a State of Charge (SoC) of the power component, and a temperature state of the power component; and
     a power converter that regulates a current flow between the power bus and the power component; and
   a control processor that: (1) receives the state of each power component from the respective adaptable connector, (2) determines an amount of power at least one of the power components is to supply to the power bus based in part on the received states of the power components, and (3) communicates with the adaptable connectors thereby causing the at least one adaptable connector to supply the amount of power determined in (2) onto the power bus.

2. The system of claim 1, wherein the control processor is configured to communicate instructions to each of the adaptable connectors to balance current flow between each of the power components.

3. The system of claim 1, wherein the power components interchangeably receive power and provide power.

4. The system of claim 1, wherein at least one of the power components is a motor, and wherein at least one of the power components is a battery.

5. The system of claim 1, wherein the power converter of one of the adaptable connectors is substantially identical to the power converter of another one of the adaptable connectors.

6. The system of claim 1, wherein each of the adaptable connectors further comprises:
   a sensor that is coupled to the processor of the adaptable connector, wherein the sensor is used to determine the state of the power component.

7. The system of claim 6, wherein the sensor is selected from the group consisting of: a voltage sensing device, a temperature sensing device, and a current sensing device.

8. The system of claim 1, wherein the control processor communicates with each of the adaptable connectors to receive the state of each of the power components and to communicate the desired current to be supplied from each of the power components to the power bus.

9. A system comprising:
   a power bus;
   a plurality of adaptable connectors, wherein each of the adaptable connectors is coupled to a power component and to the power bus, wherein at least two of the adaptable connectors control a voltage of the power bus, and wherein each of the adaptable connectors comprises:
     a processor that determines a state of the power component; and
     a power converter that regulates a current flow between the power bus and the power component; and
   a control processor that: (1) receives the state of each power component from the respective adaptable connector, (2) determines an amount of power at least one of the power components is to supply to the power bus based in part on the received states of the power components, and (3) communicates with the adaptable connectors thereby causing the at least one adaptable connector to supply the amount of power determined in (2) onto the power bus.

10. The system of claim 9, wherein the state of the power component is taken from the group consisting of: a State of Health (SoH) of the power component, a State of Charge (SoC) of the power component, and a temperature state of the power component.

11. The system of claim 9, wherein the power components interchangeably receive power and provide power.

12. The system of claim 9, wherein at least one of the power components is a motor, and wherein at least one of the power components is a battery.

13. The system of claim 9, wherein the power converter of one of the adaptable connectors is substantially identical to the power converter of another one of the adaptable connectors.

14. The system of claim 9, wherein each of the adaptable connectors further comprises:
   a sensor that is coupled to the processor of the adaptable connector, wherein the sensor is used to determine the state of the power component.

15. The system of claim 14, wherein the sensor is selected from the group consisting of: a voltage sensing device, a temperature sensing device, and a current sensing device.

16. A system comprising:
   a power bus;
   a first adaptable connector that couples a first power component to the power bus, wherein the first power component is a battery pack, and wherein the first adaptable connector comprises:
     a switching power converter;
     a processor that determines a value indicative of the battery pack state; and
     a power controller that regulates a first current flow between the first battery pack and the power bus;
   a second adaptable connector that couples a second power component to the power bus, wherein the second power component is a second battery pack, and wherein the second adaptable connector comprises:
     a switching power converter;
     a processor that determines a value indicative of the battery pack state; and
     a power controller that regulates a second current flow between the second battery pack and the power bus;
   a third adaptable connector that couples a third power component to the power bus, wherein the third power component is a motor, and wherein the third adaptable connector comprises:
     a switching power converter;

a processor that determines a value indicative of a motor state; and a power controller that regulates a third current flow between the motor and the power bus; and a control processor that: (1) receives the values indicative of the state of each power component, (2) determines an amount of power at least one of the power components is to supply to another one of the power components based in part on the received values, and (3) balances the current flow between each of the power components based on the amount of power determined in (2).

17. The system of claim 16, wherein the battery pack state is taken from the group consisting of: a State of Health (SoH) of the battery pack, a State of Charge (SoC) of the battery pack, and a temperature state of the battery pack, and wherein the motor state is taken from the group consisting of: a State of Health (SoH) of the motor, and a temperature state of the motor.

18. The system of claim 16, wherein the power bus is an Alternating Current (AC) power bus, and wherein at least two of the adaptable connectors control a voltage of the AC power bus.

19. The system of claim 16, wherein the value indicative of the battery pack state of the first battery pack is a first temperature, wherein the the value indicative of the battery pack state of the second battery pack is a second temperature that is greater than the first temperature, and wherein the processor balances in (3) by increasing the first current flow and decreasing the second current flow based on the second temperature being greater than the first temperature.

* * * * *